(12) United States Patent
Yip et al.

(10) Patent No.: US 8,751,647 B1
(45) Date of Patent: Jun. 10, 2014

(54) METHOD AND APPARATUS FOR NETWORK LOGIN AUTHORIZATION

(75) Inventors: Michael Yip, Sunnyvale, CA (US); Indranil Bagchi, San Jose, CA (US); Brian Bunker, Oakland, CA (US); Michael Polo, Cupertino, CA (US)

(73) Assignee: Extreme Networks, San Jose, CA (US)

( * ) Notice: Subject to any disclaimer, the term of this patent is extended or adjusted under 35 U.S.C. 154(b) by 933 days.

(21) Appl. No.: 09/895,144

(22) Filed: Jun. 30, 2001

(51) Int. Cl.
*G06F 15/16* (2006.01)
*G06F 15/173* (2006.01)
*H04L 12/46* (2006.01)
*H04L 29/12* (2006.01)

(52) U.S. Cl.
CPC ...... *H04L 12/4641* (2013.01); *H04L 29/12245* (2013.01); *H04L 29/12226* (2013.01)
USPC .......................................... 709/225; 709/245

(58) Field of Classification Search
CPC .................... H04L 12/4641; H04L 29/12245; H04L 29/12226
USPC ................. 709/203, 217–225, 227–229, 245; 370/401; 713/155–159, 182–186; 726/2–15
See application file for complete search history.

(56) References Cited

U.S. PATENT DOCUMENTS

| 5,544,322 | A |   | 8/1996  | Cheng et al. |         |
|-----------|---|---|---------|--------------|---------|
| 5,586,260 | A |   | 12/1996 | Hu           |         |
| 5,752,003 | A | * | 5/1998  | Hart ........................... | 709/223 |
| 5,764,887 | A |   | 6/1998  | Kells et al. |         |
| 5,805,801 | A | * | 9/1998  | Holloway et al. ............... | 726/22  |
| 5,898,780 | A | * | 4/1999  | Liu et al. ........................ | 713/155 |
| 6,021,495 | A | * | 2/2000  | Jain et al. ........................ | 726/16  |
| 6,085,238 | A | * | 7/2000  | Yuasa et al. ..................... | 709/223 |
| 6,115,376 | A | * | 9/2000  | Sherer et al. ................... | 370/389 |
| 6,205,147 | B1| * | 3/2001  | Mayo et al. .................... | 370/397 |
| 6,298,383 | B1|   | 10/2001 | Gutman et al. |         |
| 6,311,218 | B1| * | 10/2001 | Jain et al. ...................... | 709/229 |
| 6,339,830 | B1| * | 1/2002  | See et al. ........................ | 726/15  |

(Continued)

OTHER PUBLICATIONS

Cisco Systems, Inc. "Controlling Access to the Switch Using Authentication", http://www.cisco.com/univercd/cc/td/doc/product/lan/cat5000/rel_5_2/config/authent.html Oct. 1, 1999.*

(Continued)

*Primary Examiner* — Patrice Winder
*Assistant Examiner* — Julian Chang
(74) *Attorney, Agent, or Firm* — Blakely, Sokoloff, Taylor & Zafman LLP (57) ABSTRACT

A method and apparatus is provided to control the admission of a user to a network by preventing a port through which the user connects to the network from forwarding data packets until the user is authorized. A network login controller operates in conjunction with a user interface to receive a user identification data from the port user. The network login controller further operates in conjunction with an authorization server to authenticate the user by sending a user authentication request containing the user identification data to the authentication server. The network login controller grants or denies permission to the user to access the network based on the user authentication response from the authentication server. If permission is granted, then the network login controller unblocks the port through which the user is connected to place it in packet-forwarding mode. If permission is denied, then the port remains in packet non-forwarding mode (i.e. it remains blocked).

25 Claims, 7 Drawing Sheets

(56) References Cited

U.S. PATENT DOCUMENTS

| | | | |
|---|---|---|---|
| 6,393,484 B1 | 5/2002 | Massarani | |
| 6,418,466 B1 | 7/2002 | Bertram et al. | |
| 6,539,431 B1 | 3/2003 | Sitaraman et al. | |
| 6,560,236 B1* | 5/2003 | Varghese et al. | 370/401 |
| 6,618,757 B1* | 9/2003 | Babbitt et al. | 709/226 |
| 6,643,782 B1* | 11/2003 | Jin et al. | 726/3 |
| 6,657,956 B1 | 12/2003 | Sigaud | |
| 6,684,243 B1* | 1/2004 | Euget et al. | 709/222 |
| 6,704,873 B1 | 3/2004 | Underwood | |
| 6,724,734 B1* | 4/2004 | Shabtay et al. | 370/254 |
| 6,741,592 B1* | 5/2004 | Edsall et al. | 370/389 |
| 6,748,439 B1* | 6/2004 | Monachello et al. | 709/229 |
| 6,792,474 B1* | 9/2004 | Hopprich et al. | 709/245 |
| 6,874,090 B2* | 3/2005 | See et al. | 726/13 |
| 6,892,309 B2* | 5/2005 | Richmond et al. | 726/7 |
| 6,912,637 B1* | 6/2005 | Herbst | 711/167 |
| 6,954,790 B2* | 10/2005 | Forslow | 709/227 |
| 6,957,199 B1 | 10/2005 | Fisher | |
| 6,976,088 B1* | 12/2005 | Gai et al. | 709/238 |
| 7,002,936 B2* | 2/2006 | Agrawal et al. | 370/329 |
| 7,024,478 B1* | 4/2006 | Dalgic et al. | 709/225 |
| 7,036,143 B1 | 4/2006 | Leung et al. | |
| 7,039,037 B2 | 5/2006 | Wang et al. | |
| 7,124,189 B2 | 10/2006 | Summers et al. | |
| 7,127,524 B1 | 10/2006 | Renda et al. | |
| 7,143,435 B1 | 11/2006 | Droms et al. | |
| 7,149,219 B2 | 12/2006 | Donahue | |
| 7,171,555 B1 | 1/2007 | Salowey et al. | |
| 7,197,556 B1* | 3/2007 | Short et al. | 709/224 |
| 7,216,173 B2 | 5/2007 | Clayton et al. | |
| 7,356,841 B2* | 4/2008 | Wilson et al. | 726/15 |
| 7,389,534 B1 | 6/2008 | He | |
| 7,428,237 B1* | 9/2008 | Gai et al. | 370/395.53 |
| 7,451,220 B1* | 11/2008 | Dalgic et al. | 709/225 |
| 7,640,287 B1* | 12/2009 | Gai et al. | 709/200 |
| 7,848,264 B1* | 12/2010 | Gai et al. | 370/256 |
| 2001/0012296 A1* | 8/2001 | Burgess et al. | 370/392 |
| 2002/0049655 A1 | 4/2002 | Bennett et al. | |
| 2002/0095573 A1 | 7/2002 | O'Brien | |
| 2002/0120732 A1* | 8/2002 | Lee et al. | 709/223 |
| 2002/0136226 A1* | 9/2002 | Christoffel et al. | 370/401 |
| 2002/0144144 A1 | 10/2002 | Weiss et al. | |
| 2002/0146002 A1* | 10/2002 | Sato | 370/386 |
| 2003/0035409 A1 | 2/2003 | Wang et al. | |
| 2003/0041136 A1 | 2/2003 | Cheline et al. | |
| 2003/0115480 A1 | 6/2003 | McDysan | |
| 2003/0140131 A1 | 7/2003 | Chandrashekhar et al. | |
| 2003/0147403 A1 | 8/2003 | Border et al. | |
| 2004/0006708 A1 | 1/2004 | Mukherjee et al. | |
| 2004/0015728 A1 | 1/2004 | Cole et al. | |
| 2004/0030890 A1 | 2/2004 | Chu et al. | |
| 2004/0034797 A1 | 2/2004 | Hof | |
| 2004/0064604 A1 | 4/2004 | Cox | |
| 2004/0103275 A1 | 5/2004 | Ji et al. | |
| 2004/0117653 A1 | 6/2004 | Shapira et al. | |
| 2004/0193513 A1 | 9/2004 | Pruss et al. | |
| 2004/0230841 A1 | 11/2004 | Savini | |
| 2004/0255154 A1 | 12/2004 | Kwan et al. | |
| 2006/0168648 A1* | 7/2006 | Vank et al. | 726/4 |
| 2006/0206625 A1* | 9/2006 | Moineau | 709/245 |
| 2008/0101240 A1* | 5/2008 | Rohilla et al. | 370/236 |
| 2012/0291098 A1* | 11/2012 | Janakiraman et al. | 726/3 |

OTHER PUBLICATIONS

Network World Fusion "Circuit extensions assist Ethernet over ATM" http://www.nwfusion.com/news/tech/2002/1014techupdate. html Oct. 14, 2002.*

Poger, Elliot, and Mary Baker. "Secure Public Internet Access Handler (SPINACH)." USENIX Symposium on Internet Technologies and Systems. 1997.*

Yemini, Yechiam, Alexander V. Konstantinou, and Danilo Florissi. "NESTOR: An architecture for network self-management and organization." Selected Areas in Communications, IEEE Journal on 18.5 (2000): 758-766.*

Bahl, P., Anand Balachandran, and Srinivasan Venkatachary. "The Choice network-broadband wireless Internet access in public places." Microsoft Research (2000).*

Appenzeller, Guido, Mema Roussopoulos, and Mary Baker. "User-friendly access control for public network ports." INFOCOM'99. Eighteenth Annual Joint Conference of the IEEE Computer and Communications Societies. Proceedings. IEEE. vol. 2. IEEE, 1999.*

Chen, Mike, Barbara Hohlt, and Tal Lavian. "Popeye-Using Fine-grained Network Access Control to Support Mobile Users and Protect Intranet Hosts."dated Dec. 11, 2000: 1-8.*

Konstantinou, Alexander V., et al. "Managing Security in Dynamic Networks."LISA. 1999.*

Bahl, Paramvir, Srinivasan Venkatachary, and Anand Balachandran. "Secure wireless internet access in public places." Communications, 2001. ICC 2001. IEEE International Conference on. vol. 10. IEEE, 2001.*

Rabinovitch, Eddie. "Enterprise LAN Trends." Int. CMG Conference. 1999.*

Cisco Systems, Inc., "Controlling Access to the Switch Using Authentication," http://www.cisco.com/univercd/cc/td/doc/product/lan/cat5000/rel_5_2/config/authent.html Oct. 1, 1999, 35 pgs.

Final Office Action for U.S. Appl. No. 10/645,459, Mailed Feb. 6, 2009, 20 pages.

Notice of Allowance for U.S. Appl. No. 10/645,459 dated Jun. 2, 2009, 9 pages.

Office Action for U.S. Appl. No. 10/645,459 dated Oct. 30, 2006, 11 pages.

Final Office Action for U.S. Appl. No. 10/645,459 dated Apr. 13, 2007, 14 pages.

Office Action for U.S. Appl. No. 10/645,459 dated Sep. 26, 2007, 15 pages.

Advisory Action for U.S. Appl. No. 10/645,459 dated Apr. 9, 2009, 3 pages.

Final Office Action for U.S. Appl. No. 10/645,459 dated Mar. 20, 2008, 18 pages.

Office Action for U.S. Appl. No. 10/645,459 dated Jul. 24, 2008, 15 pages.

* cited by examiner

METHOD AND APPARATUS FOR NETWORK LOGIN AUTHORIZATION

FIELD OF THE INVENTION

The present invention relates to the field of network security. In particular, the present invention relates to a network security system that controls access to a network at the edges of the network.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2001, Extreme Networks, Inc., All Rights Reserved.

BACKGROUND OF THE INVENTION

In recent history, the architecture of computer network topologies has changed dramatically. In the past, computer networks were mainly private networks contained within a private office. Now, however, an entire building with multiple offices of different companies may make up a single local area network (LAN), a user may use a laptop to access a wireless LAN in a public place, or a student may plug a laptop into network ports in various classrooms. Situations like these open a network to potential cyber-attacks that may compromise the security of network resources and also prevent access by legitimate users. As a consequence, network resource providers are under enormous pressure to provide bulletproof security and foolproof access control, so that no matter what type of method a user uses to access the network, whether it be via a modem, network interface card (NIC), or by some other means, private information and network resources remain secure. Security mechanisms in the devices at the network edge, such as LAN switches, are particularly critical because they grant access to the rest of the network.

The difficulties associated with securing a network have existed ever since computer networks were first introduced. Over the years a variety of techniques have been employed to provide network security. Generally most of these security techniques take place between network nodes (a node is an end point for data transmissions, such as a computer workstation, network server, CD-ROM jukebox, or some other such device) and not between connection points (a connection point is an intermediate point in the network, such as a router, hub, or a switch). Some of those methods include encryption techniques to prevent unauthorized access to a network resource, such as a network server or network printer. For example, techniques like private key and public key encryption codes transmit encrypted data between individual machines.

A common network security technique is the login procedure, which occurs when a network node attaches to a network resource, such as when a user logs into a server. Typically, the user is prompted for authentication information, such as a username and password or an identification card. Once the user inputs the authentication information, a user authentication system compares the user's input to user authentication and authorization information stored in a database. If the user's input is valid the user is granted access to certain administrator-defined network resources.

An example of a user authentication system employed in login procedures is the Novell Directory Services database or the Remote Authentication Dial-In User Service (RADIUS). The RADIUS service is actually a protocol for carrying authentication, authorization, and configuration information between an access server and an authentication server. The RADIUS protocol has been documented as an Internet standard protocol, the most recent version of which is Request For Comment (RFC) 2865, Rigney, C., Willens, Rubens, A., Simpson, W., *RADIUS*, June 2000.

A login procedure using the RADIUS protocol secures networks against unauthorized access using a centralized authentication server ("the RADIUS server") in communication with an access server ("the RADIUS client") using the RADIUS protocols. All of the user information necessary for authenticating users seeking access to the network and various network services resides on the RADIUS server. A network access server operates as a RADIUS client by sending authentication requests to the RADIUS server using the client protocols. In response the RADIUS server either accepts, rejects, or challenges the authentication request, and the RADIUS client acts on that response to permit or deny access to the network and various network services, or to request more information from the user. A drawback to prior art login procedures is that a user who plugs a computer into a network port has immediate access to the network, although they may not necessarily have access to any of the resources on the network (i.e. they have not yet successfully completed the login procedure).

Other prior art network security techniques have been implemented at a connection point (i.e. at the LAN switch level) to prevent intruder and hacker attacks. For example, algorithms and techniques have been designed and implemented in LAN switches to prohibit cyber-attacks, such as access control lists (ACLs), Denial of Service (DoS) attack protection as documented in Request for Comments (RFC) 2267, *Network Ingress Filtering: Defeating Denial of Service Attacks which employ IP Source Address Spoofing*, January 1998, and Synchronize (SYN) attack protection.

For example, access lists were developed to combat cyber-attacks on the LAN switch by providing an administrator-controlled list of Internet Protocol (IP) addresses or media access control (MAC) addresses that were authorized to access the network. DoS and SYN attack protections are based on similar concepts. For example, when a hacker overloads a targeted connection point such as a router or a LAN switch with incoming data packets, the router or LAN switch is prevented from accepting new legitimate requests for services, resulting in a denial of service. When the targeted device is behind a firewall, an access list protects against such attacks by explicitly restricting inbound access to the device to a select few IP addresses.

A major drawback to access lists, DoS, and SYN attack protections is that access to the network is machine- or hardware-based instead of user-based. Therefore, an unauthorized user who has access to an authorized machine can still gain access to the network, completely bypassing the intended security protection. Moreover, publicly accessed network resources, e.g. a web server not protected by a firewall, are more susceptible since access to a public resource cannot usually be restricted to certain machines or IP addresses. Finally, most of the security measures currently in place to defend against such attacks are proprietary and therefore expensive to implement.

The Institute of Electrical and Electronics Engineers (IEEE) has proposed a solution to providing controlled access to networks using port-based security measures, as documented in IEEE protocol 802.1x, Mar. 21, 2001. While still in draft form, the IEEE proposal has already gained the support of several wireless technology based companies. IEEE 802.1x uses the Point-to-Point Extensible Authentication Protocol (EAP), documented in RFC 2284, and published in March 1998, and layer-2 communication methods to prevent access to a network.

A drawback to the IEEE 802.1x approach to network access control is that it creates an entirely new communications protocol that requires software and, in some cases, hardware upgrades to bring devices on the network into compliance with the new protocol. Specifically, adoption of the IEEE 802.1x approach forces software companies to update software to comply with the standard, which in turns means that individual users would have to download and install those software updates in order to use the features proposed by the new protocol. This applies not only to human computer users, but also to network printers, network servers, and any other device that is capable of accessing a network. The IEEE 802.1x approach may also force users to update older hardware to comply with the new technology standard, since hardware companies may not find it viable to invest time and money into updating old hardware driver files and providing the necessary read-only memory (ROM) updates for older devices, such as an old network printer.

What is needed, therefore, is a way to prevent a user from accessing not only network resources and services, but also the network itself, until the user is authorized. To provide such controlled network access without requiring expensive hardware and software upgrades presents a unique set of challenges requiring a new and novel solution.

SUMMARY

According to one aspect of the invention, a method is provided to control the admission of a user to a network by preventing a port through which the user connects to the network from forwarding data packets until the user is authorized. A network login controller operates in conjunction with a user interface to receive a user identification data from the port user. The network login controller further operates in conjunction with an authorization server to authenticate the user by sending a user authentication request containing the user identification data to the authentication server. The network login controller grants or denies permission to the user to access the network based on the user authentication response from the authentication server. If permission is granted, then the network login controller unblocks the port through which the user is connected to place it in packet-forwarding mode. If permission is denied, then the port remains in packet non-forwarding mode (i.e. it remains blocked).

According to one aspect of the invention, the authentication server further provides the network login controller with user policy configuration data for configuring the port for authorized users. The policy configuration data may include reassigning the user's IP address to a different VLAN (i.e. a permanent VLAN) than the one with which they initially connected to the port.

According to one aspect of the invention, the network login controller operates in conjunction with an address server to provide the user with an initial IP address with which to authenticate the user. Alternatively, the initial IP address may be a static IP address such as a MAC address or other IP address previously assigned to the user's computer prior to connecting to the port.

According to one aspect of the invention, the network login controller, user interface, authentication server, and address server may be implemented on one or more network devices, such as a switch or other packet-forwarding device, a network server computer, and an end station or host computer.

In accordance with these and other aspects of the present invention, apparatus are provided for carrying out the above and other methods.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description various aspects of the present invention, a method and apparatus for network login authorization will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well known architectures, steps, and techniques have not been shown to avoid unnecessarily obscuring the present invention. For example, specific details are not provided as to whether the method and apparatus is implemented in a switch, router, bridge, server or gateway, as a software routine, hardware circuit, firmware, or a combination thereof.

Parts of the description will be presented using terminology commonly employed by those skilled in the art to convey the substance of their work to others skilled in the art, including terms of operations performed by a network operating system, and their operands, such as transmitting, receiving, routing, login, packets, messages, user name, command, and the like. As well understood by those skilled in the art, these operands take the form of electrical, magnetic, or optical signals, and the operations involve storing, transferring, combining, and otherwise manipulating the signals through electrical, magnetic or optical components of a system. The term system includes general purpose as well as special purpose arrangements of these components that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

It should be noted that while the description that follows addresses the method and apparatus as it applies to a Local Area Network (LAN), it is appreciated by those of ordinary skill in the art that method is generally applicable to any Transport Control Protocol/Internet Protocol (TCP/IP)-based network including, but not limited to, internetworks, Virtual Local Area Networks (VLANs), Metropolitan Area Networks (MANs), and Wide Area Networks (WANs), as well as networks organized into subnets.

Figure 1:
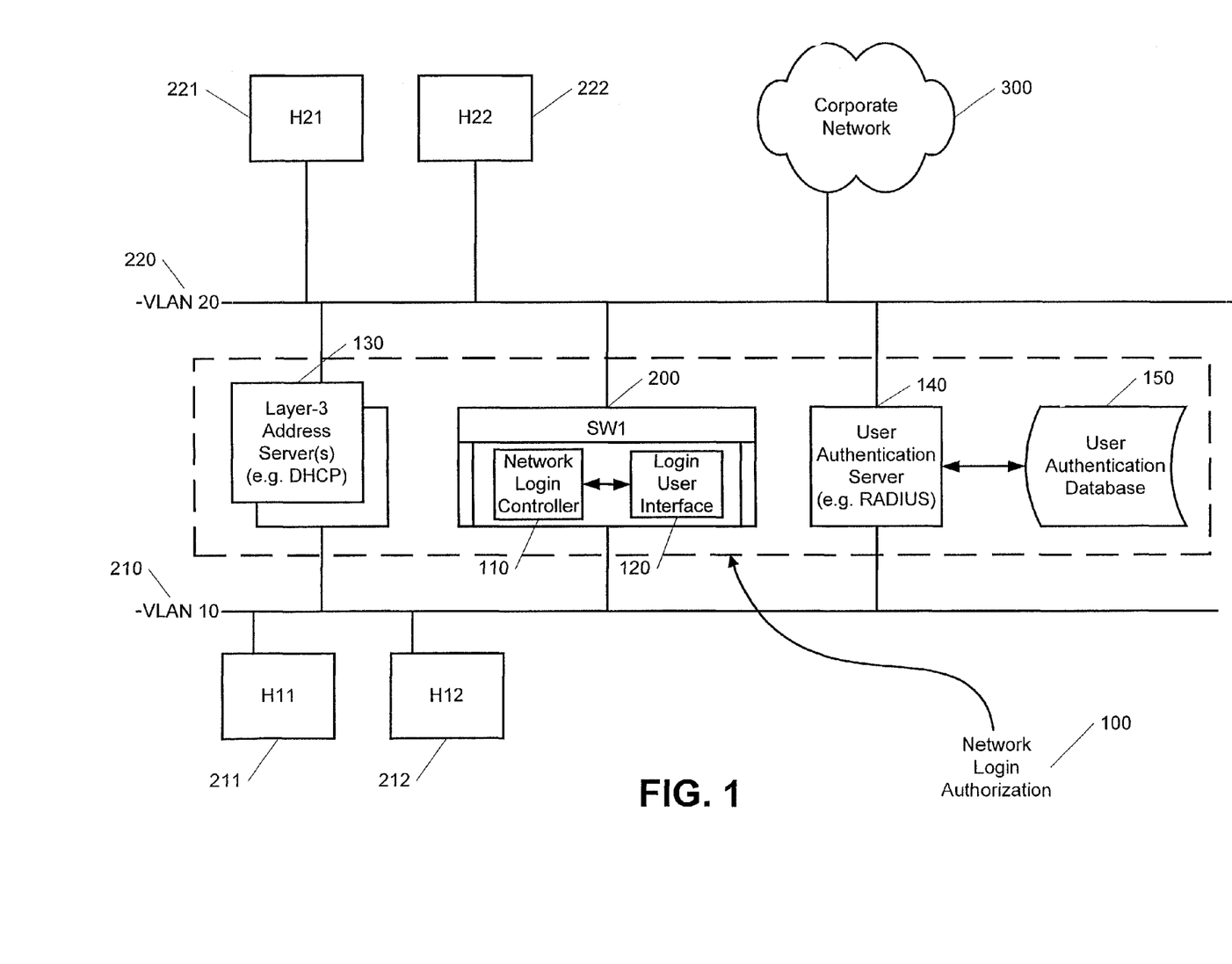
FIG. 1 is a block diagram illustrating a network configured in accordance with one embodiment of the present invention.

FIG. 1 is a block diagram illustrating a network configured in accordance with one embodiment of the present invention. As illustrated, the network includes virtual local area networks VLAN10 210 and VLAN20 220 (i.e. layer-2 domains), and a packet-forwarding device SW1 200, connecting VLAN10 210 and VLAN20 220 to the rest of the corporate network 300. The packet-forwarding device SW1 200 is typically a switch device at the edge of the corporate network 300 that provides packet-forwarding services. In the illustrated embodiment, end stations H11 211 and H12 212 connect to switch SW1 200 as part of VLAN10 210, and end stations H21 221 and H22 222 connect to switch SW1 200 as part of VLAN20 220. Of course, numerous other configurations of end hosts and VLANs may be employed without departing from the scope of the present invention.

End stations H11 211, H12 212, H21 221, and H22 222, connect to corporate network 300 using SW1 200, but are prevented from accessing corporate network 300 until after successfully using network login authorization 100. The network login authorization 100 may include a network login controller 110 which operates in conjunction with a login user interface 120 and a user authentication server 140 to block SW1 200 from forwarding packets from end stations H11 211, H12 212, H21 221, and H22 222 to corporate network 300 until the identity of the end station's user has been authenticated using data from user authentication database 150. This results in preventing the user from accessing the entire corporate network 300 until the network login controller 110 authorizes the user to do so.

In one embodiment, the user interface 120 may comprise a web browser facility such as the Microsoft Internet Explorer, or the Netscape browsers, that is resident on the end station/hosts (e.g. H11 211), with the network login controller 110 functioning as a web server that accepts the user identification data 121 and relays it to the authentication server 140. The web server also serves informational data regarding the success or failure of the network login authorization 100 as well as reports on status inquiries on the authorization state of the port and the like. Alternatively, the user interface 120 may be a text-based interface, or a command-line interface without departing from the scope of the invention.

The method and apparatus for network login authorization 100 is suitable for operating in a variety of networked environments. One environment is the "campus environment," where the typical user is a roaming user that connects to the network at various locations throughout the campus. In the campus environment, the port through which the user connects is not assigned to a permanent VLAN (i.e. layer-2 domain) until the user is authorized through the network login authorization 100. The other environment is the network provider (e.g. an Internet service provider) environment, where the typical user is stationary. In the network provider environment, the port and VLAN through which the user connects is constant, i.e. the port is already assigned to a permanent VLAN.

In the campus environment, the authentication server 140 is usually a RADIUS server, and the RADIUS server provides the necessary configuration details (e.g. the permanent VLAN ID to which the port will be assigned) of what will happen to the port once a successful authentication takes place. In both the campus and network provider environments, prior to authorization through network login authorization 100, the user must obtain a temporary layer-3 address in order to gain access to the network login controller 110 and user interface 120 on packet-forwarding device 200. In one embodiment, the network login authorization 100 includes a layer-3 address server 130 accessible to the packet-forwarding device 200 to dynamically assign a temporary layer-3 address to the user's end station (e.g. H11 211). In an alternate embodiment, a static layer-2 address, such as the user's end station MAC address may be adequate for purposes of obtaining access to the network login controller 110 and user interface 120 on packet-forwarding device 200. The temporary layer-3 address is discarded upon successful authentication through network login authorization 100, after which the user must obtain another layer-3 address, this time a permanent one, through an address server 130 on the permanent VLAN to which the port has been assigned (which may or may not be the same address server 130 which assigned the temporary address, as long as it is accessible on the permanent VLAN to which the port has been assigned).

Figure 2:
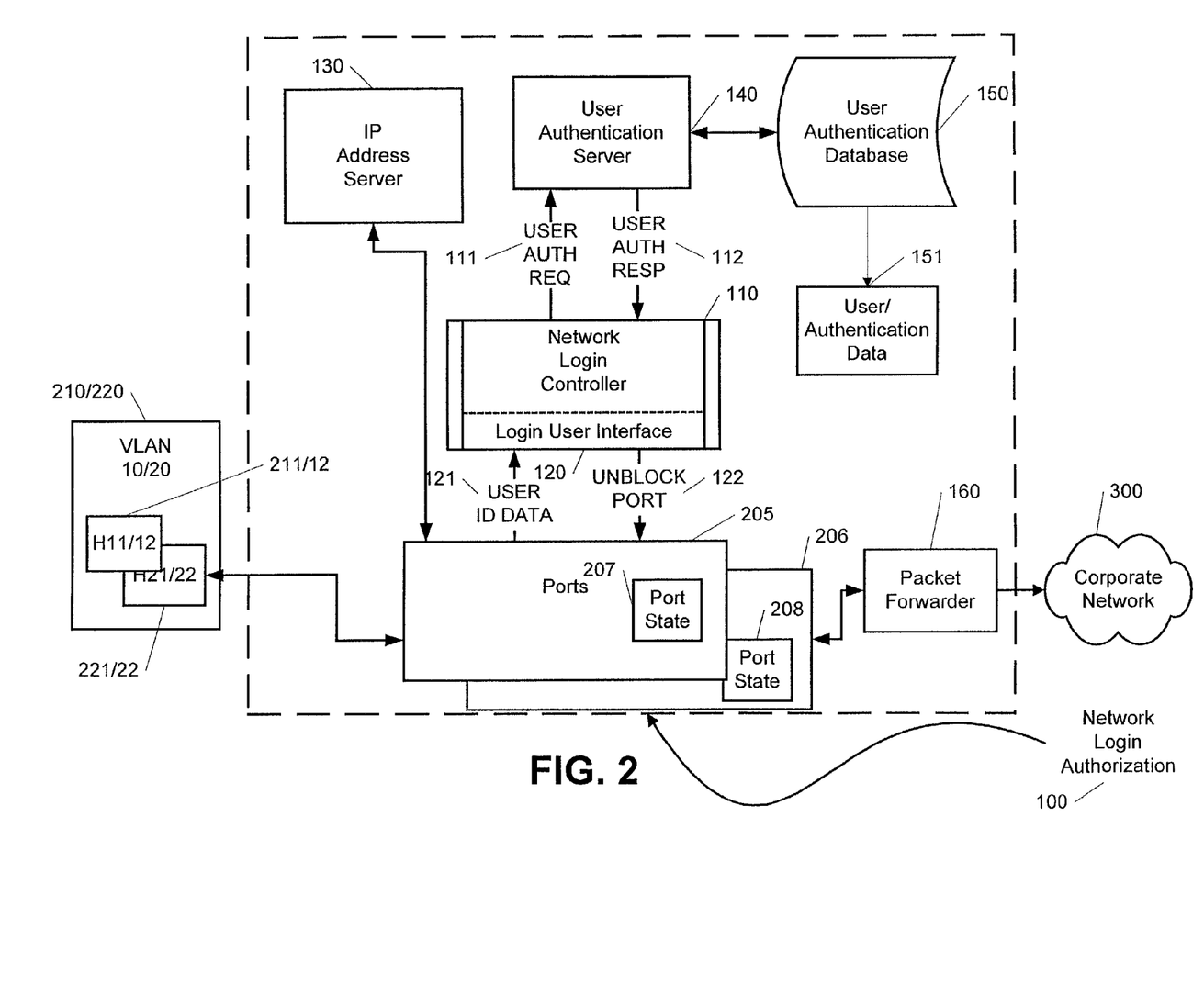
FIG. 2 is a block diagram illustrating selected components of the network login authorization of FIG. 1 in further detail in accordance with one embodiment of the present invention.

FIG. 2 is a block diagram illustrating selected components of the network login authorization 100 of FIG. 1 in further detail in accordance with one embodiment of the present invention. As illustrated, the network login controller 110 operates in conjunction with the user interface 120 to obtain user identification data 121 from an end station/host computer, e.g. H11 211 connected through port 205. The initial default port state 207 of port 205 is unauthorized. It should be noted that not all ports on the packet-forwarding device SW1 200 need to participate in network login authorization 100. Rather, the network login authorization 100 may be implemented on a per port per VLAN (i.e. a layer-2 domain) basis. Thus, for example, the network login controller 110 may require users connecting to port 205 to be authorized using the network login authorization 100, but not users connecting to port 206. In that case, the initial default port state 208 of port 206 would be authorized. Similarly, the network login controller 110 may require users connecting to port 205 from end station/host computers in VLAN10 210 to be authorized using the network login authorization 100 (where VLAN10 is comprised, for example, of ordinary network users having restricted access to corporate network 300), but not users connecting to port 205 from VLAN20 220 (where VLAN20 is comprised, for example, of administrative network users having preferred authorization privileges in accessing the corporate network 300). Stated differently, in one embodiment network login authorization 100 may be enabled (i.e. activated) for some ports and some VLANs on a given packet-forwarding device 200, but not others. This provides flexibility for tagged ports that belong to more than one VLAN, since network login authorization 100 may be activated on a single tagged port for one VLAN and not the other.

Figure 3:
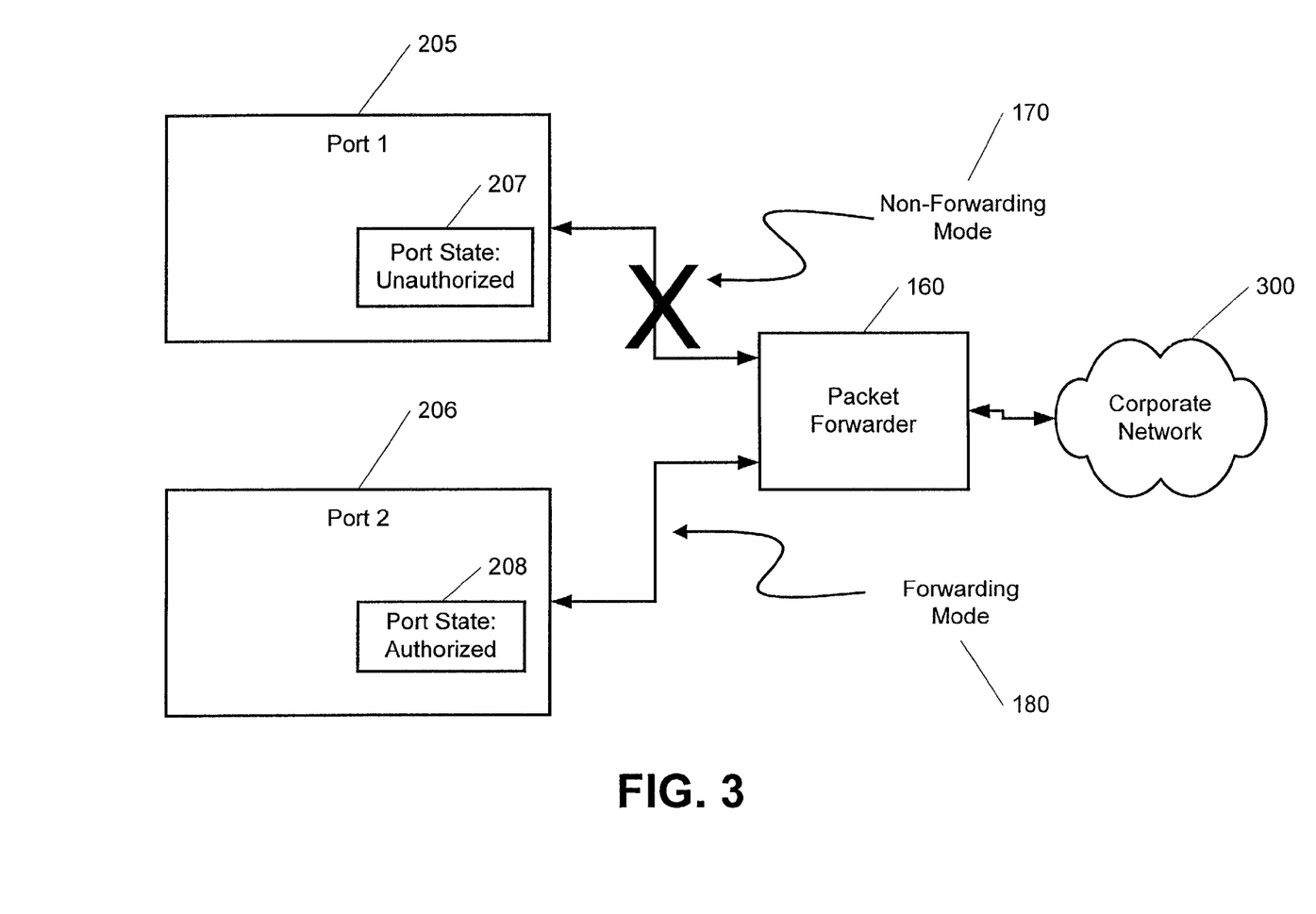
FIG. 3 is a block diagram illustrating selected components of the network login authorization of FIG. 2 in further detail in accordance with one embodiment of the present invention.

FIG. 3 is a block diagram illustrating the ports 205 and 206 and their respective port statuses 207/208 in further detail in accordance with one embodiment of the present invention. As shown, each port may be in a different state depending on whether or not an authorized user has connected to the port and successfully completed the network login authorization 100 (or depending on whether network login authorization 100 has been activated for that port or for the VLAN of the host connected to that port). In the example illustrated in FIG. 3, port 205 has a port state 207 of unauthorized. The unauthorized port state 207 of port 205 places the port 205 into a non-forwarding mode 170. Non-forwarding mode 170 causes the packet forwarder 160 to block packets to and from the port 205. Conversely, the port state 208 of port 206 is authorized, which places the port 206 into a forwarding mode 180. Forwarding mode 180 causes the packet forwarder 160 to send and receive packets to and from the port 206 as it normally would.

Returning now to FIG. 2, after the network login controller 110 obtains user identification data 121 from an end station/host computer, e.g. H11 211, connected through port 205 in conjunction with the user interface 120, the network login controller 110 sends a user authentication request 111 to a user authentication server 140. The user authentication server 140 retrieves the user authentication data 151 from a user authentication database 150, and compares it to the user identification data 121 provided in the user authentication request 111. If the data compare favorably, then the user authentication server 140 returns a positive user authentication response 112 to the network login controller 110, which indicates that the user is authentic. The network login controller sends an unblock port command 122 to the port 205, which sets the port state 207 to authorized. This places the port 205 into forwarding mode 180 so that the packet forwarder 160 of packet forwarding device 200 can commence forwarding packets to and from the user connected through port 205 on end station/host computer H11 211 of VLAN10 210.

If the data does not compare favorably, then the user authentication server 140 returns a negative user authentication response 112 to the network login controller 110 which indicates that the user cannot be authenticated with the provided user identification data 121. The user interface 120 continues to prompt the user to provide more accurate user identification data 121 and port state 207 remains unauthorized. As a result, port 205 remains in non-forwarding mode 170, which prevents the packet forwarder 160 from forwarding packets for the user connected through port 205 on end-station/host computer H11 211 of VLAN10 210.

In one embodiment, the user authentication server 140 is a RADIUS server, and the network login controller 110 functions as a RADIUS client. In that case, the user authentication request 111 and user authentication response 112 are data packets conforming to the RADIUS communication protocol for communicating authentication data. The operation of the RADIUS server and communication protocol is known in the art and will not be further discussed except as it pertains to the method and apparatus of the present invention.

In an alternate embodiment, the network login controller 110 may use a user authentication database 150 directly instead of through a user authentication server 140. In that case, the user authentication database 150 may comprise an internal database stored on the packet-forwarding device 200, and the user authentication request 111 and user authentication response 112 may be handled through internal communication.

Returning again to FIG. 2, prior to obtaining the user identification data 121, the end station/host computer H11 211 needs at least a temporary IP address to gain access to the network login controller 110 and associated user interface 120 on packet-forwarding device 200. In some cases the end station/host computer, e.g. H11 211, uses its MAC address, while in other cases the end station/host computer uses a previously obtained IP address, such as in the case of an Internet service provider environment where the user uses the same port and VLAN for authentication each time. Sometimes, the end station/host computer needs to obtain a temporary IP address from the packet-forwarding device 200 before network login authorization 100 can take place, such as in the case of a campus environment where a roaming user will not always be using the same port for authentication. In one embodiment, assigning a temporary IP address to end station/host computer H11 211 is handled by an IP address server 130. One example of an IP address server that may be used is a Dynamic Host Control Protocol (DHCP) server accessible by the packet-forwarding device 200. In an alternate embodiment, the DHCP server may be implemented in the packet-forwarding device 200 itself. The operation of the IP address server is known in the art and will not be further discussed except as it pertains to the method and apparatus of the present invention.

Figure 4:
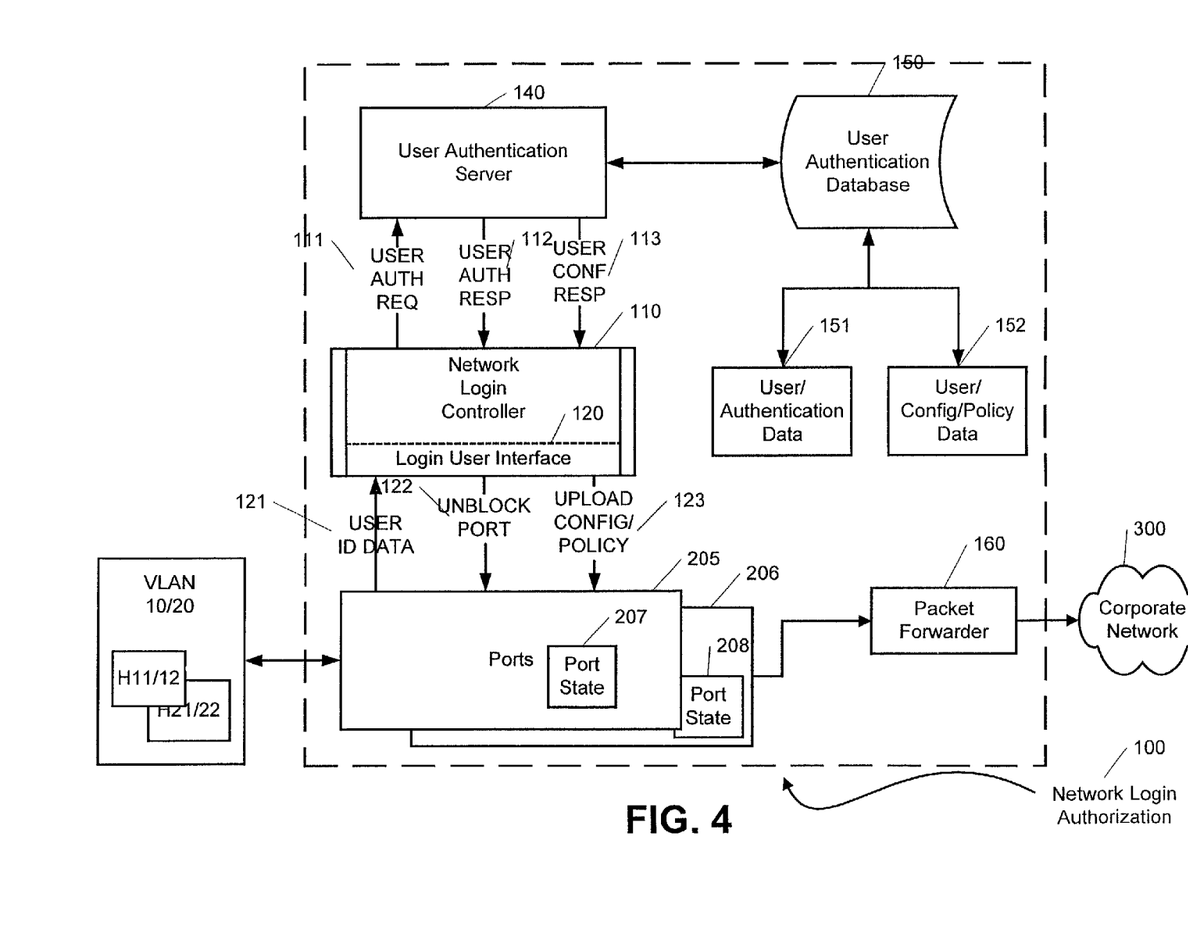
FIG. 4 is a block diagram illustrating selected components of the network login authorization of FIG. 2 in further detail in accordance with one embodiment of the present invention.

FIG. 4 is a block diagram illustrating additional selected components of the network login authorization 100 of FIGS. 1-2 in further detail in accordance with one embodiment of the present invention. In one embodiment, once the network login controller 110 sends an unblock port command 122 to the port 205, setting the port state 207 to authorized, the network login controller 110 may receive policy configuration data 152 from the user authentication server 140. Specifically, the user authentication server 140 retrieves a user configuration/policy data 152 from the user authentication database 150. The user configuration/policy data 152 is typically stored on a RADIUS server, but could also be stored on any network management server accessible to the packet-forwarding device 200. The configuration policy data 152 is sent in a user configuration response 113 to the network login controller 110. The network login controller 110 automatically uploads 123 the configuration and policy data 152 to the authorized port 205 without network administrator intervention. The ability to automatically upload the policy and configuration data 152 to the authorized port eliminates the need to manually store the policy and configuration data 152 on the packet-forwarding device 200 as well as the need to manually configure the port 205. The automatic configuration is especially advantageous in the campus environment, where the users are roaming users that are not assigned to a permanent port or VLAN. A port that has been dynamically configured with user-specific policy each time the user connects to the network 300 allows for greater control of network resources, as well as the ability to more accurately log user activity and network usage and, as a result, to generate more accurate billing information.

Figure 5:
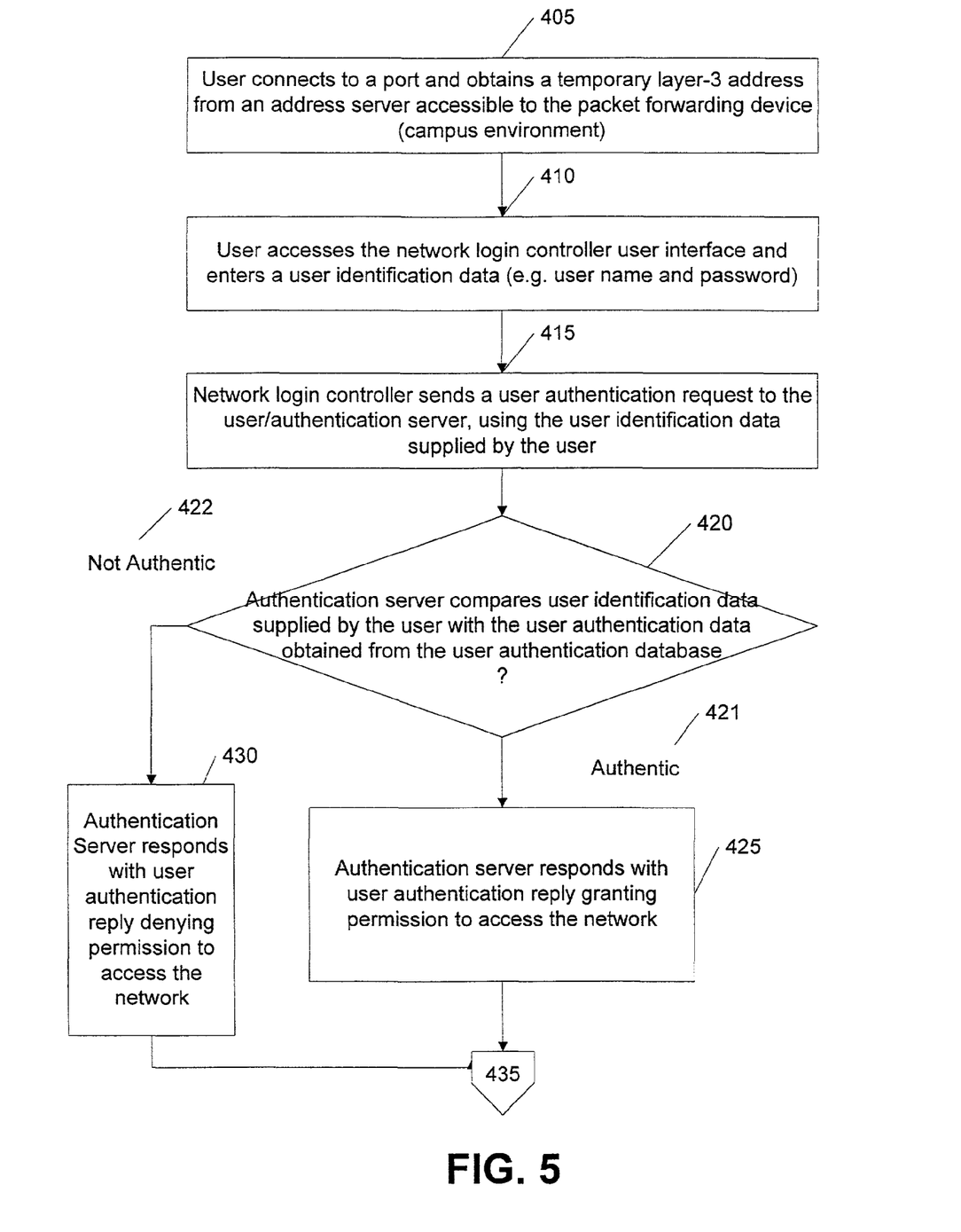
FIG. 5 is a flow diagram illustrating certain aspects of a method to be performed by a computer executing one embodiment of the illustrated invention shown in FIGS. 1-4.
Figure 6:
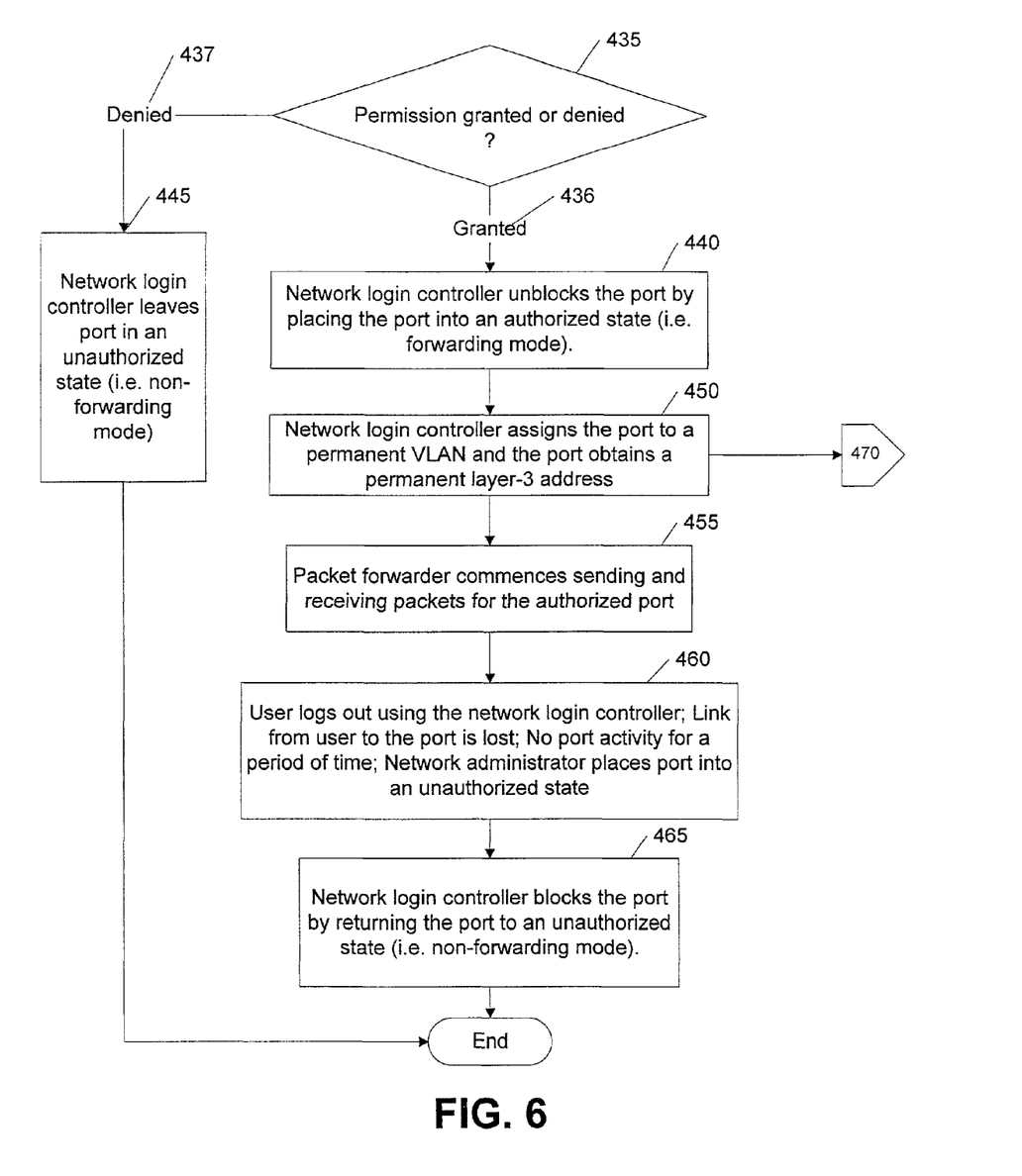
FIG. 6 is a flow diagram illustrating certain additional aspects of a method to be performed by a computer executing one embodiment of the illustrated invention shown in FIGS. 1-4.
Figure 7:
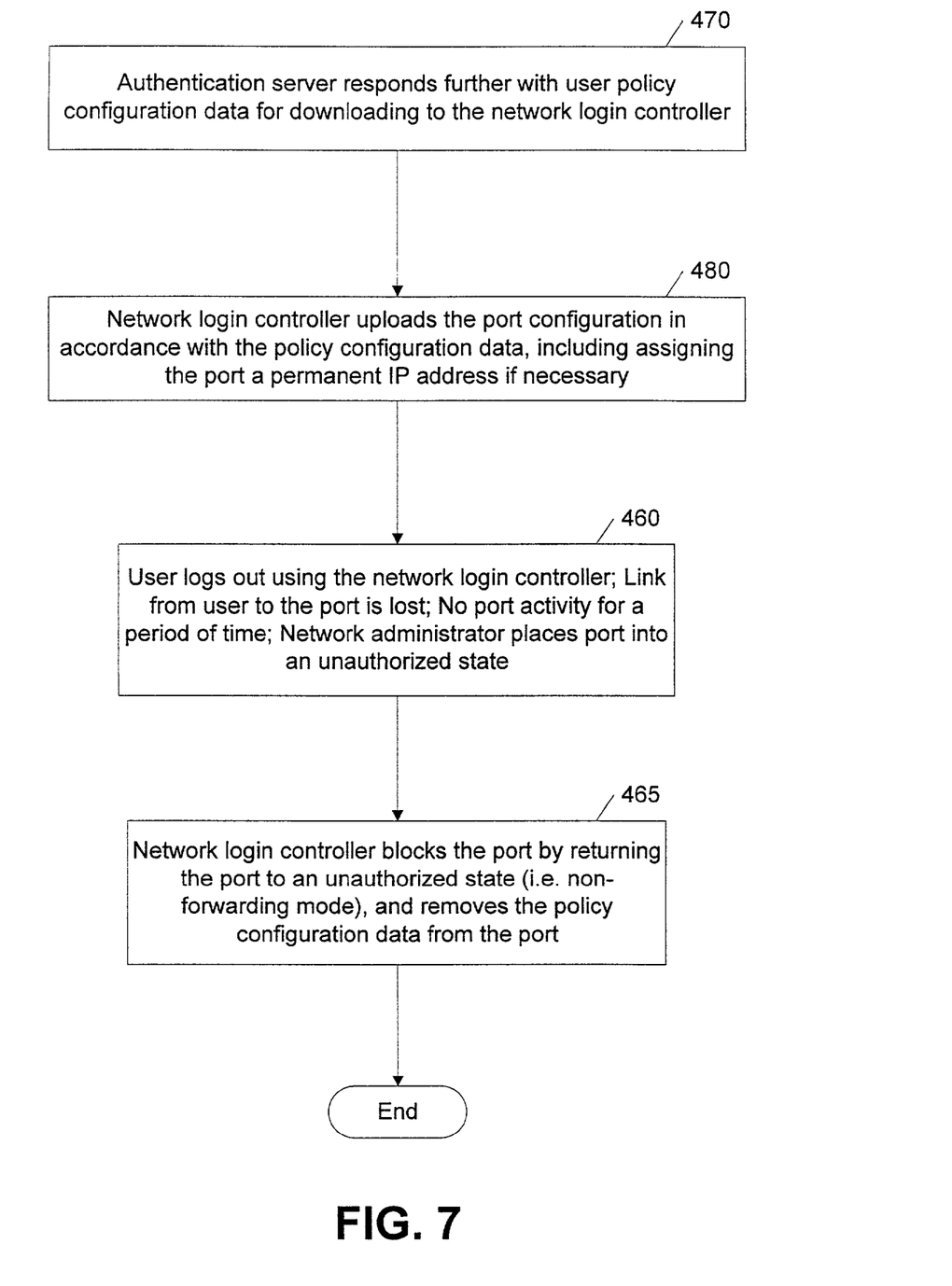
FIG. 7 is a flow diagram illustrating certain additional aspects of a method to be performed by a computer executing one embodiment of the illustrated invention shown in FIGS. 1-4.

Referring to FIGS. 5-7, certain aspects of the network login authorization 100 to control access to a network are shown. In particular, FIGS. 5-7 illustrate some of the acts to be performed by a computer executing a network login controller 110 on a packet-forwarding device 200 that incorporates one embodiment of the invention. The particular methods of the invention are described in terms of software with reference to a series of flowcharts. In this context, the methods to be performed by a packet-forwarding device 200 incorporating an embodiment of the invention constitute computer programs made up of computer-executable instructions. Describing the methods by reference to a flowchart enables one skilled in the art to develop such programs including such instructions to carry out the methods on suitably configured computers or devices (i.e. the processor of the computer or other device executing the instructions from computer-accessible media). The computer-executable instructions may be written in a computer programming language or may be embodied in firmware logic. If written in a programming language conforming to a recognized standard, such instructions can be executed on a variety of hardware platforms and for interface to a variety of operating systems and network operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application . . . ), as taking an action or causing a result. Such expressions are merely a shorthand way of saying that execution of the software by a computer causes the processor of the computer to perform an action or a produce a result.

In one embodiment, at processing block 405 of FIG. 5, the user connects to a port of a packet-forwarding device 200 and, if necessary, obtains a temporary IP address from an IP address server 130 accessible to device 200. In one embodiment, the IP address server 130 is a DHCP server that may reside on the network 300, or in the packet switching device 200 itself. A temporary IP address is required in the campus environment where a typical user is a roaming user that may connect to the network from any number of ports that are available at various locations on the campus. At processing block 410, the user access the network login controller 110 by navigating to the user interface 120 where the user is prompted to enter a user identification data 121 such as a user name and password. At processing block 415, the network login controller 110 sends a user authentication request 111 to the user authentication server 140, using the user identification data 121 entered by the user. At block 420, the authentication server 140 compares the user identification data 121 entered by the user with user authentication data 151 obtained from the user authentication database 150. If the data compares favorably, then the user is authenticated 421, and at block 425 the user authentication server 140 responds with a positive user authentication reply 112. However, if the data does not compare favorably, then the user is not authenticated 142, and at block 430 the user authentication server responds with a negative user authentication reply 112.

In one embodiment, at processing block 435 of FIG. 6, the network login controller 110 determines from the user authentication reply 112 whether the user has been authenticated 421 or not authenticated 422. If the user is authenticated 421, then the network login controller 110 grants permission 436 to the user to access the corporate network 300, and processing continues at block 440 where the network login controller 110 unblocks the port to which the user connected by placing it into an authorized state. If the user is not authenticated 422, then the network login controller 110 denies permission 437 to the user to access the corporate network 300, and processing continues at block 445 where the network login controller 110 leaves the port in an unauthorized state, or if necessary, unblocks the port to which the user connected by placing it into an unauthorized state. If the port has been placed into an authorized state, then at processing block 450 the network login controller 110 assigns the port to a permanent VLAN using port configuration data that has been obtained from the authentication server 140 and authentication database 150, or from some other network management server accessible to the packet-forwarding device, or even from configuration data stored in the packet forwarding device itself. In one embodiment, such as in the campus environment, the permanent port configuration is obtained from a RADIUS server. Once the port has been assigned to a permanent VLAN, then at processing block 450 the port obtains a permanent layer-3 address using an address server 130 that is accessible on the permanent VLAN. In one embodiment, the permanent layer-3 address is obtained from a DHCP server that resides on the permanent VLAN to which the port has been assigned.

At processing block 455, the packet forwarder recognizes that the port is in a forwarding mode, and commences sending and receiving packets for the authorized port and port user. The packet forwarding services provided by the packet forwarder continue until, at processing block 460, the network login controller 110 resets the port back into a unauthorized state (i.e. non-forwarding mode). In one embodiment, the resetting is performed when a user successfully logs off the packet forwarding device 200 from the user interface 120, when a connection from the user to the port is disconnected, when no activity from the user occurs on the port for a duration of time, or when an administrator forces the port to change its state. The resetting is completed at block 465 where the network login controller 110, if necessary, blocks the port by placing it into an unauthorized state.

In one embodiment, at processing block 470 of FIG. 7, after the port has been assigned to a permanent VLAN and the port has obtained a permanent layer-3 address at block 450, the authentication server 140 responds further with user policy configuration data 152 obtained from the user authentication database 150 for downloading to the network login controller 110. At processing block 480, the network login controller 110 uploads the port configuration in accordance with the user policy configuration data 152 provided by the user authentication server 140. Once port configuration is complete, processing resumes until as before, at block 460, when the port is reset back into an unauthorized state. The resetting is completed at block 465 where the network login controller 110, if necessary, blocks the port by placing it into an unauthorized state.

Accordingly, a novel method and apparatus is described in which a network login authorization 100 prevents a user connected to port from accessing a network until the user has been authorized, on a per-port and per-VLAN basis. From the foregoing description, those skilled in the art will recognize that many other variations of the present invention are possible. In particular, while the present invention has been described as being implemented in a network comprising a packet forwarding device 200, an address server 130 for serving a temporary as well as a permanent layer-3 IP address, a user authentication server 140, a user authentication database 150, network login controller 110 and user interface 120, one or more ports 205/206 and associated port states 207/208, and numerous hosts and VLANs, it should be noted that some of the logic described herein may be distributed in other components of a network or internetwork application without departing from the scope of the present invention.

For example, embodiments of the invention may be represented as a software product stored on a machine-accessible medium (also referred to as a computer-readable medium or a processor-readable medium). The machine-accessible medium may be any type of magnetic, optical, or electrical storage medium including a diskette, CD-ROM, memory device (volatile or non-volatile), or similar storage mechanism. The machine-accessible medium may contain various sets of instructions, code sequences, configuration information, or other data. As an example, the procedures described herein for network login controller 110, the user interface 120, the address server 130, and the authentication server 140, and the associated protocols can be stored on the machine-accessible medium. In addition, the data for the authentication server 140 and associated authentication database 150, or the address server 130 and associated data may be stored in an internal storage area or on an external storage medium that is machine-accessible. Those of ordinary skill in the art will appreciate that other instructions and operations necessary to implement the described invention may also be stored on the machine-accessible medium.

Thus, the present invention is not limited by the details described. Instead, the present invention can be practiced with modifications and alterations within the spirit and scope of the appended claims.

What is claimed is:

1. A method comprising:
blocking a port on a packet forwarding device to prevent a user connected to the port from sending and receiving data packets, the port belonging to a plurality of virtual local area networks (VLANs), wherein blocking comprises setting a port state of the port on the packet forwarding device to unauthorized for one or more of the plurality of VLANs to which it belongs;
generating an authentication Internet Protocol (IP) address capable of being used to authenticate the user connected to the blocked port from an endstation belonging to one of the plurality of VLANs for which the port is blocked;
authenticating the user connected to the port via the authentication IP address assigned to the user by an authentication server; and
in response to successfully authenticating the user, unblocking the port to enable the user to send and receive data packets, wherein unblocking comprises setting the port state of the port on the packet forwarding device to authorized for the VLAN to which the endstation belongs.

2. The method of claim 1, wherein authenticating comprises:
receiving a user identification data from the user connected to the port; and
verifying whether the user identification data is authentic.

3. The method of claim 2, wherein verifying comprises:
sending the user identification data to an authentication server; and
receiving an indication from the authentication server whether the user identification data is authentic.

4. The method of claim 3, wherein sending and receiving is performed in accordance with the Remote Authentication Dial-In Service (RADIUS) communication protocol.

5. The method of claim 1, further comprises assigning the unblocked port to a permanent VLAN.

6. The method of claim 5, further comprising:
assigning a temporary layer-3 address to the user when the port is blocked; and
assigning a permanent layer-3 address to the user when the port is unblocked.

7. The method of claim 6, wherein the temporary address is obtained from a first address server accessible to the packet forwarding device.

8. The method of claim 6, wherein the permanent address is obtained from a second address server accessible to the permanent VLAN to which the unblocked port is assigned.

9. The method of claim 7, wherein the first address server comprises a DHCP server.

10. The method of claim 9, wherein the DHCP server is located on the packet forwarding device.

11. The method of claim 8, wherein the second address server comprises a DHCP server.

12. An apparatus comprising:
a packet forwarding device coupled to the edge of a network, the packet forwarding device having a blocked port that prevents a user connected to the port from an endstation belonging to one of a plurality of virtual local area networks (VLANs) for which the port is blocked from accessing the network, the blocked port having a port state on the packet forwarding device of unauthorized for any one or more of the plurality of VLANs for which the port is blocked; and
a network login controller coupled to the packet forwarding device to unblock the port for the VLAN to which the endstation belongs when the user is authenticated so that the user can access the network, wherein the network login controller in conjunction with an address server provides the user an authentication Internet Protocol (IP) address with which to authenticate the user of the port before the user is authorized, and further wherein to unblock the port is to set the blocked port's port state on the packet forwarding device to authorized for the VLAN to which the endstation belongs.

13. The apparatus of claim 12, wherein the user is authenticated when the network login controller receives a user identification data from the user connected to the port and verifies whether the user identification data is authentic.

14. The apparatus of claim 13, wherein the network login controller verifies whether the user identification data is authentic by sending the user identification data to an authentication server and receiving an indication from the authentication server whether the user identification data is authentic.

15. The apparatus of claim 14, wherein the sending and receiving is performed in accordance with the Remote Authentication Dial-In Service (RADIUS) communication protocol.

16. The apparatus of claim 12, wherein the network login controller is capable of assigning the unblocked port to a permanent VLAN.

17. The apparatus of claim 16 wherein the network login controller assigns a temporary layer-3 address to the user when the port is blocked and assigns a permanent layer-3 address to the user when the port is unblocked.

18. The apparatus of claim 17, wherein the temporary address is obtained from a first address server accessible to the packet forwarding device.

19. The apparatus of claim 17, wherein the permanent address is obtained from a second address server accessible to the permanent VLAN to which the unblocked port is assigned.

20. The apparatus of claim 18, wherein the first address server comprises a DHCP server.

21. The apparatus of claim 20, wherein the DHCP server is located on the packet forwarding device.

22. The apparatus of claim 19, wherein the second address server comprises a DHCP server.

23. The apparatus of claim 12, wherein the packet forwarding device additionally comprises an unblocked port that requires no authentication.

24. The apparatus of claim 12, wherein the blocked port prevents a first user connected to the port through a first VLAN from accessing the network but allows network access to a second user connected to the port through a second VLAN.

25. A network login authorization apparatus comprising:
a network device, coupled to the edge of a network, having a blocked port, the blocked port tagged as belonging to more than one virtual local area network (VLAN) and having a port state on the network device of unauthorized for each VLAN for which the port is blocked;

a network authentication server coupled to the network device, wherein the network authentication server provides user configuration data to configure the blocked port with an authentication Internet Protocol (IP) address for use by the network login authorization apparatus in authorizing users; and a processor, coupled to the network device and the network authentication server, to perform instructions for unblocking the blocked port in response to a request through the authentication Internet Protocol (IP) address by a user connected to the blocked port from an endstation belonging to a VLAN for which the port is blocked to access the network, wherein the request is granted when a user identification entered by the user matches a corresponding user authentication data obtained from the network authentication server, and further wherein to perform instructions for unblocking the blocked port is to perform instructions for setting the blocked port's port state on the network device, for the VLAN to which the endstation belongs, to authorized.

* * * * *